United States Patent
Coles et al.

(10) Patent No.: US 10,013,274 B2
(45) Date of Patent: *Jul. 3, 2018

(54) MIGRATING VIRTUAL MACHINES TO PERFORM BOOT PROCESSES

(71) Applicant: HEWLETT-PACKARD DEVELOPMENT COMPANY, L.P., Houston, TX (US)

(72) Inventors: Alistair Coles, Bath (GB); Aled Edwards, Charfield South (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 185 days.

This patent is subject to a terminal disclaimer.

(21) Appl. No.: 15/265,548

(22) Filed: Sep. 14, 2016

(65) Prior Publication Data

US 2017/0004003 A1    Jan. 5, 2017

Related U.S. Application Data (63) Continuation of application No. 13/562,716, filed on Jul. 31, 2012, now Pat. No. 9,471,355.

(51) Int. Cl.
| | | |
|---|---|---|
| G06F 9/455 | (2018.01) | |
| G06F 21/53 | (2013.01) | |
| G06F 21/55 | (2013.01) | |
| G06F 9/4401 | (2018.01) | |
| G06F 21/57 | (2013.01) | |

(Continued)

(52) U.S. Cl.
CPC ........ G06F 9/45558 (2013.01); G06F 9/4401 (2013.01); G06F 21/53 (2013.01); G06F 21/556 (2013.01); G06F 21/575 (2013.01); H04L 9/3247 (2013.01); H04L 63/061 (2013.01);

(Continued)

(58) Field of Classification Search
CPC .................................................. G06F 9/45558
See application file for complete search history.

(56) References Cited

U.S. PATENT DOCUMENTS

| | | |
|---|---|---|
| 8,074,262 B2 | 12/2011 | Scarlata |
| 8,646,054 B1 | 2/2014 | Karr et al. |

(Continued)

FOREIGN PATENT DOCUMENTS

JP   2010073011   4/2010

OTHER PUBLICATIONS

Hughes, J., Encrypted Storage and Key Management for the Cloud [online], Jul. 23, 2009 [retrieved on Jul. 30, 2012], Retrieved from the Internet: <http://www.cryptoclarity.com/CryptoClarityLLC/Welcome/Entries/2009/7/23_Encrypted_Storage_and_Key_Management_for_the_cloud.html> (6 pages).

(Continued)

*Primary Examiner* — Charlie Sun
(74) *Attorney, Agent, or Firm* — HPI Patent Department (57) ABSTRACT

In some examples, an indication that a virtual machine is to begin a boot process is received. In response to the received indication and prior to beginning the boot process, the virtual machine is migrated from a first host to a secured host, where the secured host includes a security mechanism to provide security that is unavailable at the first host. In response to the migrating, the boot process of the virtual machine is initiated at the secured host. The virtual machine is migrated from the secured host to a host other than the secured host in response to determining that the boot process of the virtual machine at the secured host is complete.

20 Claims, 9 Drawing Sheets

(51) Int. Cl.
*H04L 9/32* (2006.01)
*H04L 29/06* (2006.01)

(52) U.S. Cl.
CPC ........... *G06F 2009/4557* (2013.01); *G06F 2009/45575* (2013.01); *G06F 2009/45587* (2013.01)

(56) References Cited

U.S. PATENT DOCUMENTS

| | | |
|---|---|---|
| 2008/0098392 A1 | 4/2008 | Wipfel et al. |
| 2010/0071025 A1 | 3/2009 | Devine et al. |
| 2009/0106409 A1 | 4/2009 | Murata |
| 2009/0204718 A1 | 8/2009 | Lawton et al. |
| 2011/0035574 A1 | 2/2011 | Jevans et al. |
| 2011/0099548 A1 | 4/2011 | Shen et al. |
| 2011/0131421 A1 | 6/2011 | Jogand-Coulomb et al. |
| 2014/0223556 A1 | 8/2011 | Bignon |
| 2011/0246767 A1 | 10/2011 | Chaturvedi et al. |
| 2011/0258701 A1 | 10/2011 | Cruz |
| 2011/0271279 A1 | 11/2011 | Pate |
| 2011/0302400 A1 | 12/2011 | Maino et al. |
| 2012/0054486 A1 | 3/2012 | Lakkavalli et al. |
| 2012/0137098 A1 | 5/2012 | Wang et al. |
| 2012/0159634 A1 | 6/2012 | Haikney et al. |
| 2013/0086318 A1 | 4/2013 | Bello et al. |
| 2014/0025961 A1 | 1/2014 | Mackintosh et al. |

OTHER PUBLICATIONS

Imran Khan, Habib-ur Rehman, Zahid Anwar, Design and Deployment of a Trusted Eucalyptus Cloud, 2011 IEEE 4th, International Conference on Cloud Computing, IEEE, p. 380-387.

MIGRATING VIRTUAL MACHINES TO PERFORM BOOT PROCESSES

CROSS-REFERENCE TO RELATED APPLICATION

This is a continuation of U.S. application Ser. No. 13/562,716, filed Jul. 31, 2012, which is hereby incorporated by reference in their entirety.

BACKGROUND

Virtualization is a computing technique of executing one or more processes such as an application or an operating system within an environment that emulates another environment. For example, virtualization can be realized by executing an operating system within a virtual machine that emulates a computing system. A virtual machine is an environment defined by one or more software modules that—when hosted at computing system—emulates a physical machine such as a computing system. The emulated computing system can be said to be "virtualized." Virtualization is often used in cloud or utility computing environments to simplify system administration, improve isolation, and improve hardware utilization.

Typically, a virtual machine (or a group of virtual machines) are managed or supervised by a hypervisor. A hypervisor is an environment defined by one or more software modules that manages, controls, or multiplexes access to the hardware resources of a computing system by virtual machines hosted at that computing system. Additionally, some hypervisors manage the lifecycle (e.g., boot, execution, suspension, and termination) of virtual machines. Because the hypervisor operates between a virtual machine and the hardware resources (e.g., processors, memory, data stores, network interfaces, etc.), the hypervisor can observe data moving between those hardware resources and the virtual machine.

DETAILED DESCRIPTION

Data that passes through a hypervisor (or another environment) between a virtual machine and a host at which the virtual machine is hosted can be intercepted by the hypervisor. Thus, a malicious application exploiting the hypervisor can potentially access the data passed through the hypervisor. As a result, the malicious application can access data such as data sent or received via a network interface or data accessed at a data store such as a hard drive.

Some data accessed by a virtual machine can be particularly sensitive. Data such as cryptographic data (i.e., data such as an encryption key, a decryption key, a symmetric encryption/decryption key, or a digital certificate used to perform a cryptographic operation such as encryption, decryption, or hashing) or medical information can be referred to as sensitive data because access to such data should be carefully limited. Thus, it can be beneficial to provide heightened security precautions for operations performed by virtual machines that access sensitive data. Such operations can be referred to as secure operations.

Typically, virtual machines are hosted at homogeneous hosts within a computing environment such as a data center. In other words, virtual machines are hosted at hosts that are substantially the same. Thus, to provide heightened security precautions for secure operations, those security precautions are typically applied uniformly to a group of hosts within the computing environment, and virtual machines performing secure operations are constrained to executing at that group of hosts. Such constraints can result in unnecessarily increased costs for the computing environment due to the costs of providing the security precautions and the over-provisioning of the hosts with heightened security precautions. That is, the hosts with heightened security precautions are over-provisioned because the heightened security precautions are necessary only for the secure operations, but the virtual machines associated with those secure operations are constrained to execute at those hosts for the duration of their existence.

Implementations discussed herein include methods and systems that cause secure operations associated with virtual machines to be performed while those virtual machines are hosted at secured hosts, and allow those virtual machines to execute (or be hosted) at other hosts when the secure operations are not being performed. Thus, a virtual machine that performs or participates in a secure operation can be hosted at a common or standard host within a computing environment, and be migrated to a secured host for a secure operation. After the secure operation is complete, the virtual machine can be migrated back to the previous host or to a different host within the computing environment. Because the secured host hosts the virtual machine during the secure operation and not at other times, fewer secured hosts can be used within a computing environment to reduce costs of the computing environment.

As another example, a virtual machine can be booted at a secured host to ensure the virtual machine is booted from a secure or trusted image and/or to prevent disclosure of cryptographic data provided to the virtual machine during a boot process. The virtual machine can then be migrated to a standard host in a computing environment.

Figure 1:
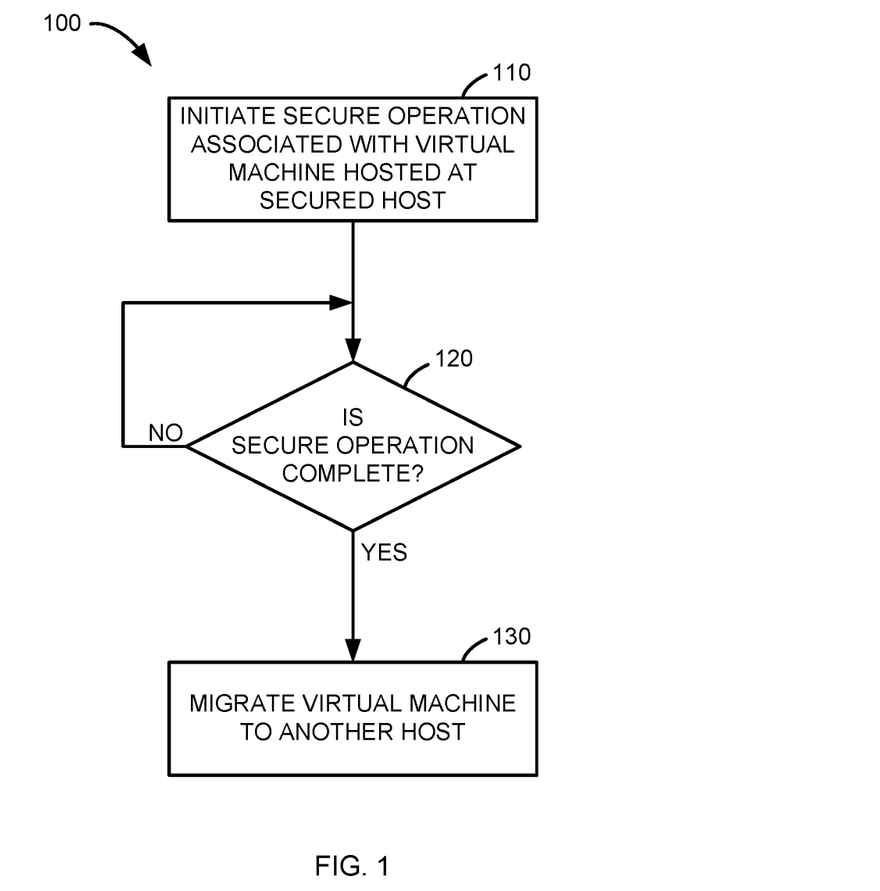
FIG. 1 is a flow chart of a process to perform a secure operation at a virtual machine, according to an implementation.

FIG. 1 is a flow chart of a process to perform a secure operation at a virtual machine, according to an implementation. Process 100 can be implemented, for example, at a secure operation system hosted at a computing system. A secure operation associated with a virtual machine hosted at a secured host is initiated at block 110. A secure operation is an operation within a computing environment that accesses, receives, modifies, transfers, or otherwise operates on or with sensitive data. For example, data such as cryptographic data such as cryptographic keys, confidential or classified information, financial information, and medical information are sensitive data. Accordingly, operations that operate on such data can be referred to as secure operations.

A secure operation can be referred to as associated with a virtual machine if that virtual machine performs at least a portion of the secure operation. For example, a secure operation is associated with a virtual machine if that virtual machine accesses, receives, or modifies sensitive data during an operation. Thus, for example, an operation in which cryptographic data (e.g., a cryptographic key) is provided to a virtual machine is a secure operation associated with that virtual machine. As another example, an operation in which a virtual machine (or a process hosted at that virtual machine) accesses or modifies sensitive data such as medical information or confidential information is a secure operation associated with that virtual machine. In some implementations, a secure operation is a sub-operation or portion of another operation or process. For example, a boot process (or operation or sequence) can include a secure operation during which sensitive data is provided to the virtual machine.

As used herein, a host is a computing system such as a computer server, a cluster of computer servers, a distributed computing environment, or some other computing environment that hosts or supports a virtual machine. For example, a computer server executing a hypervisor is a host.

A secured host is a host that includes one or more security mechanisms (or measures) to prevent unauthorized or unintended access to (e.g., reading from or writing to) a virtual machine hosted at that secured host. Said differently, a secured host is a host that relies on security mechanisms to mitigate security risks to a level that is acceptable for the secure operations (or sensitive information accessed by those secure operations) performed at that secured host or at virtual machines hosted at that secured host. Such security mechanisms can include physical isolation, verifiable integrity of a boot volume or image (e.g., the host can include a Trusted Platform Module (TPM) operable to verify the integrity of the boot volume or image), limitations on the number of virtual machines hosted at a given time (e.g., only a single virtual machine hosted at any time), a configuration or policy that limits the host to hosting virtual machines associated with or for a single entity (e.g., a single enterprise), a configuration or policy causing the host to reboot from a trusted boot volume or image or a boot volume or image with verifiable integrity,), a configuration or policy causing the host to reboot after a secure operation is performed, some other security mechanism, or a combination thereof.

Moreover, as used herein, a secured host not only includes such security mechanisms, but also hosts virtual machines temporarily while a secure operation associated with those virtual machines are performed. In other words, a secured host is a host that includes security mechanisms to mitigate security risks to a level that is acceptable for particular secure operations associated with a virtual machine that are performed while the virtual machine is temporarily hosted at that secured host. Thus, a virtual machine is hosted at a secured host while a secure operation (or a group of secure operations) associated with the virtual machine is performed, but the virtual machine is not generally hosted at the secured host. Accordingly, a policy or configuration of a computing environment can designate one or more hosts that include security mechanisms to mitigate security risks to a level that is acceptable for particular secure operations within the computing environment as secured hosts at which virtual machines are hosted during secure operations associated with those virtual machines, and other hosts at which virtual machines are generally hosted. Moreover, in some implementations, a secured host can include additional or specific security mechanisms that are not included at other hosts.

A secure operation associated with a virtual machine hosted at a secured host can be initiated at block 110 using a variety of methodologies. For example, a secure operation system implementing process 100 can provide a signal such as a data packet via a network interface (e.g., a virtual network interface) of that virtual machine, an emulated hardware signal, or some other signal to cause the virtual machine or a process hosted (or executed) at the virtual machine to begin a secure operation. As another example, a secure operation can be (or include) a boot process at a virtual machine during which the virtual machine accesses a cryptographic key. More specifically, the secured host hosting the virtual machine can initiate the secure operation by initiating the boot process executing the virtual machine and providing bootstrap instructions to the virtual machine.

As another example, the secure operation system can initiate a secure operation as part of migrating a virtual machine to the secured host. More specifically, for example, the secure operation system can migrate the virtual machine to the secure host in response to a request by the virtual machine (or a process or software application hosted at the virtual machine) or by a client of the virtual machine for a secure operation associated with the virtual machine. As another example, the secure operation system can migrate the virtual machine to the secure host in response to determining that a secure operation associated with the virtual machine has been started or will be started, and resume the virtual machine at the secured host to initiate the secure operation.

As a specific example, a hypervisor of a host hosting a virtual machine can determine that the virtual machine is preparing to perform a secured process (e.g., based on access by the virtual machine to specific emulated hardware devices such as a storage volume or files or directories within a storage volume or data transferred via a virtual network interface of the virtual machine), suspend the virtual machine, and notify the secure operation system that a secure operation associated with the virtual machine has been detected. The secure operation system can then migrate the virtual machine to the secured host, and initiate the secure operation by resuming the virtual machine at the secured host. As another example, a virtual machine can provide a signal to a secure operation system to indicate the virtual machine will perform a secure operation.

As used herein, migrating a virtual machine means moving or transferring a virtual machine from one host to another host. Moreover, a system, module, or host can be said to migrate a virtual machine if that system, module, or host participates in the migration of that virtual machine. Thus, the host from which a virtual machine is transferred, the host to which the virtual machine is transferred, and the systems and/or modules that orchestrate or coordinate the transfer of the virtual machine can all be said to migrate the virtual machine. In other words, a system, module, or host that participates in migration of a virtual machine can be said to migrate that virtual machine.

Process 100 then determines at block 120 whether the secure operation has completed. For example, the virtual machine associated with the secure operation can provide status updates or signals via a network interface, a virtual terminal, or some other mechanism to the secure operation system implementing process 100 that indicate a present status of the secure operation. Thus, in some implementations, the secure operation system can monitor the secure operation to determine when the secure operation has completed. In other implementations, the secure operation system can determine that the secure operation is complete after a predetermined period of time has elapsed since the secure operation was initiated.

After the secure operation system determines the secure operation is complete, process 100 proceeds to block 130 at which the virtual machine is migrated to another host. That is, the secure operation system migrates the virtual machine to a host other than the secured host at block 130 after the secure operation system determines the secure operation associated with that virtual machine is complete. Thus, the secure operation system implementing process 100 can initiate a secure operation associated with a virtual machine while that virtual machine is hosted at a secured host, and migrate that virtual machine to another host such as a host within a utility computing environment that includes multiple hosts, each of which hosts multiple virtual machines.

Process 100 illustrated in FIG. 1 is an example process according to an implementation. In other implementations, a secure operation process can include additional or other steps or blocks not illustrated in FIG. 1. For example, process 100 can include a block before block 110 at which the virtual machine is migrated to the secured host. As another example, process 100 can include a block at which the secure operation system communicates (e.g., exchanges symbols representing data) to provide an integrity verification of the secured host to another entity such as a server or service with which the virtual machine communicates (e.g., to access sensitive data) during the secure operation. An integrity verification is a data set that indicates whether or to what degree the integrity of the secured host can be trusted (e.g., whether a secured host can or should be considered secure).

Figure 2:
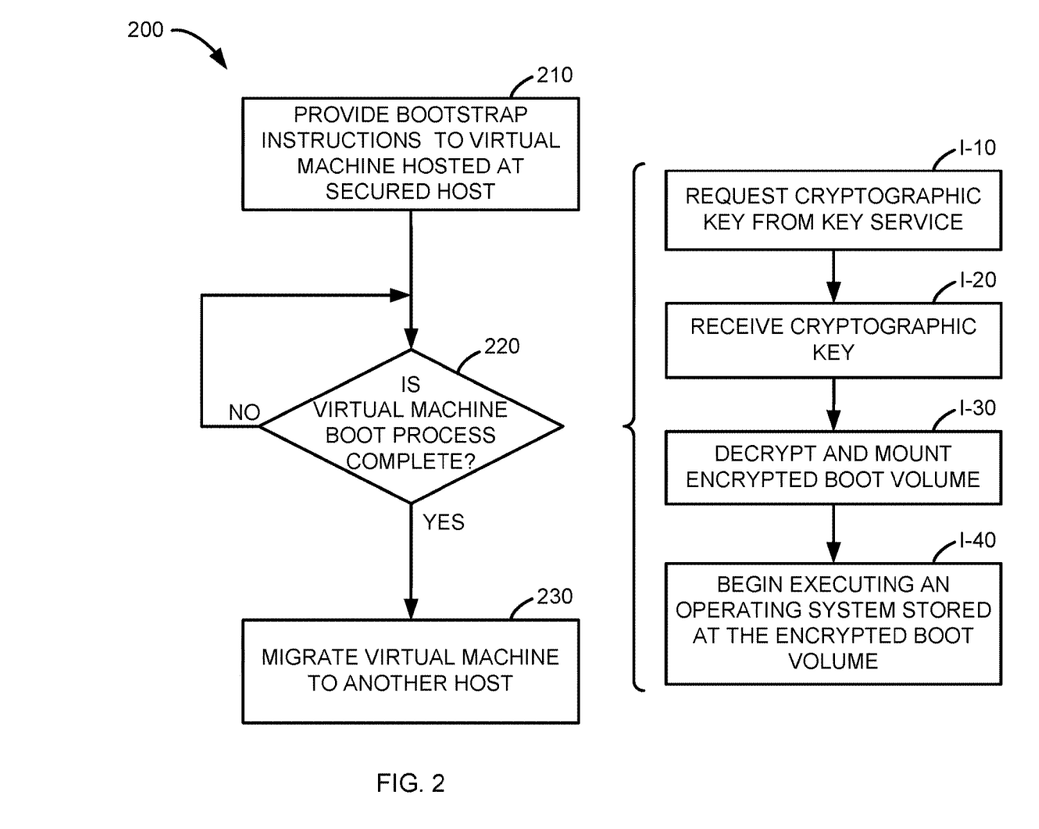
FIG. 2 is a flowchart of a process to perform a secure boot operation at a virtual machine, according to an implementation.

FIG. 2 is a flowchart of a process to perform a secure boot operation at a virtual machine, according to an implementation. Process 200 illustrated in FIG. 2 is similar to process 100 illustrated in FIG. 1, and illustrates a specific example of a secure operation. Booting a virtual machine can be or include a secure operation. For example, sensitive data can be passed or provided to the virtual machine during a boot process. As discussed above, because the virtual machine is hosted within an environment such as a hypervisor at a host, that host and environment can potentially access any data provided to or from the virtual machine. Thus, sensitive data provided to a virtual machine during a boot process can be vulnerable to eavesdropping attacks. Accordingly, booting the virtual machine at a secured host can reduce security risks because the secured host can be trusted to have mitigated such security risks to an acceptable level for a particular secure operation or a group of secure operations performed at that secured host.

As illustrated in FIG. 2, bootstrap instructions are provided to a virtual machine hosted at a secured host at block 210. Bootstrap instructions are instructions that are provided to a virtual machine that when executed within the virtual machine cause the virtual machine to perform operations to boot the virtual machine. Said differently, bootstrap instructions cause the virtual machine to perform a boot process when executed at the virtual machine. In some implementations, bootstrap instructions can be trusted bootstrap instructions. Trusted bootstrap instructions are bootstrap instructions to which mechanisms or measures are applied to prevent or identify unintended or unauthorized modifications. For example, a secure operation system implementing process 200 can verify the integrity of trusted bootstrap instructions using a cryptographic hash or digital signature before providing the trusted bootstrap instructions to the virtual machine to ensure that no unintended or unexpected alterations have been made to the trusted bootstrap instructions. As another example, trusted bootstrap instructions can be stored at a storage volume (e.g., a hard disk drive, a solid-state drive, or a disk image) or a portion of a storage volume such as a partition that is exclusively accessible to a secure operation system implementing process 200. That is, access controls such as access control lists (ACLs), permissions, or user capabilities can be applied to the storage volume (or portion thereof) to limit all access or some access (e.g., write access) to a secure operation system implementing process 200. An integrity verification can indicate the results of such measures or mechanisms.

Process 200 then proceeds to block 220 at which process 200 waits until the boot process at the virtual machine is complete. For example, a secure operation system implementing process 200 can monitor the status of the virtual machine or the boot process at the virtual machine (e.g., based on output from the virtual machine or monitoring a state of the virtual machine stored at memory allocated to the virtual machine) to determine whether the boot process is complete.

Blocks I-10, I-20, I-30, and I-40 illustrate an example boot process defined by bootstrap instructions provided to the virtual machine at block 210. That is, for example, blocks I-10, I-20, I-30, and I-40 are executed at the virtual machine while a secure operation system implementing process 200 waits at block 220 for the boot process including blocks I-10, I-20, I-30, and I-40 to complete. In the example illustrated by blocks I-10, I-20, I-30, and I-40, the boot process includes accessing a cryptographic key for decrypting an encrypted boot volume (or disk image). More specifically, the bootstrap instructions cause the virtual machine to request a cryptographic key from a key service (e.g., a key server hosting an application for accessing cryptographic keys) at block I-10. In some implementations, digital certificates, other cryptographic keys, or other authentication, identification, or integrity information are exchanged between the key service, the virtual machine, the secured host hosting the virtual machine, or a secure operation system implementing process 200 as part of the request for a cryptographic key at block I-10.

The virtual machine then receives a requested cryptographic key at block I-20, and uses the cryptographic key to decrypt and mount or otherwise access an encrypted boot volume at block I-30. Typically, the cryptographic key is stored at the virtual machine (e.g., within memory allocated to the virtual machine) and the virtual machine decrypts blocks of data at the encrypted boot volume as those blocks of data are requested or accessed by the virtual machine or applications hosted at the virtual machine. In other words, the virtual machine need not decrypt the entire encrypted boot volume at block I-30. In some implementations, the cryptographic key is requested by an entity other than the virtual machine. For example, the secured host hosting the virtual machine can request the cryptographic key, and provide the cryptographic key to the virtual machine via a virtual network interface, a shared memory interface, or some other mechanism.

The virtual machine then begins executing instructions stored at the encrypted boot volume. As illustrated in FIG. 2, the virtual machine can begin executing an operating system (e.g., instructions defining an operating system) stored at the encrypted boot volume to complete initialization of the virtual machine and cause the virtual machine to host applications to provide a service such as a web application.

As discussed above, in some implementations, a secure operation system implementing process 200 monitors the status of the virtual machine based on output such as output to a virtual terminal or signals via a virtual hardware interface to determine that the secure operation is complete. For example, in the implementation illustrated in FIG. 2, a secure operation system implementing process 200 can determine that the boot process is complete after the virtual machine begins executing the operating system at block I-40. That is, in this example, the secure data (here, the cryptographic key) has been provided to the virtual machine when the virtual machine begins executing the operating system stored at the encrypted boot volume.

After the secure operation is complete, process 200 proceeds to block 230 at which the virtual machine is migrated to another host. For example, the secured host can suspend the virtual machine, and provide state information (e.g., current state of processor registers and information about active virtual network interfaces) and pages of memory allocated to the virtual machine to another host such as an unsecured host within a cloud or utility computing environment at which other virtual machines are hosted. The other host can then resume execution of the virtual machine.

Similar to process 100, process 200 illustrated in FIG. 2 is an example process according to an implementation. In other implementations, a secure operation process can include additional or other steps or blocks not illustrated in FIG. 2. For example, process 200 can include a block after block 230 at which the secured host is rebooted to host another virtual machine while a secure operation associated with that virtual machine is performed. In other implementations, process 200 can include a block before block 210 at which the integrity of the bootstrap instructions is verified using a cryptographic digital signature of the bootstrap instructions.

Figure 3A:
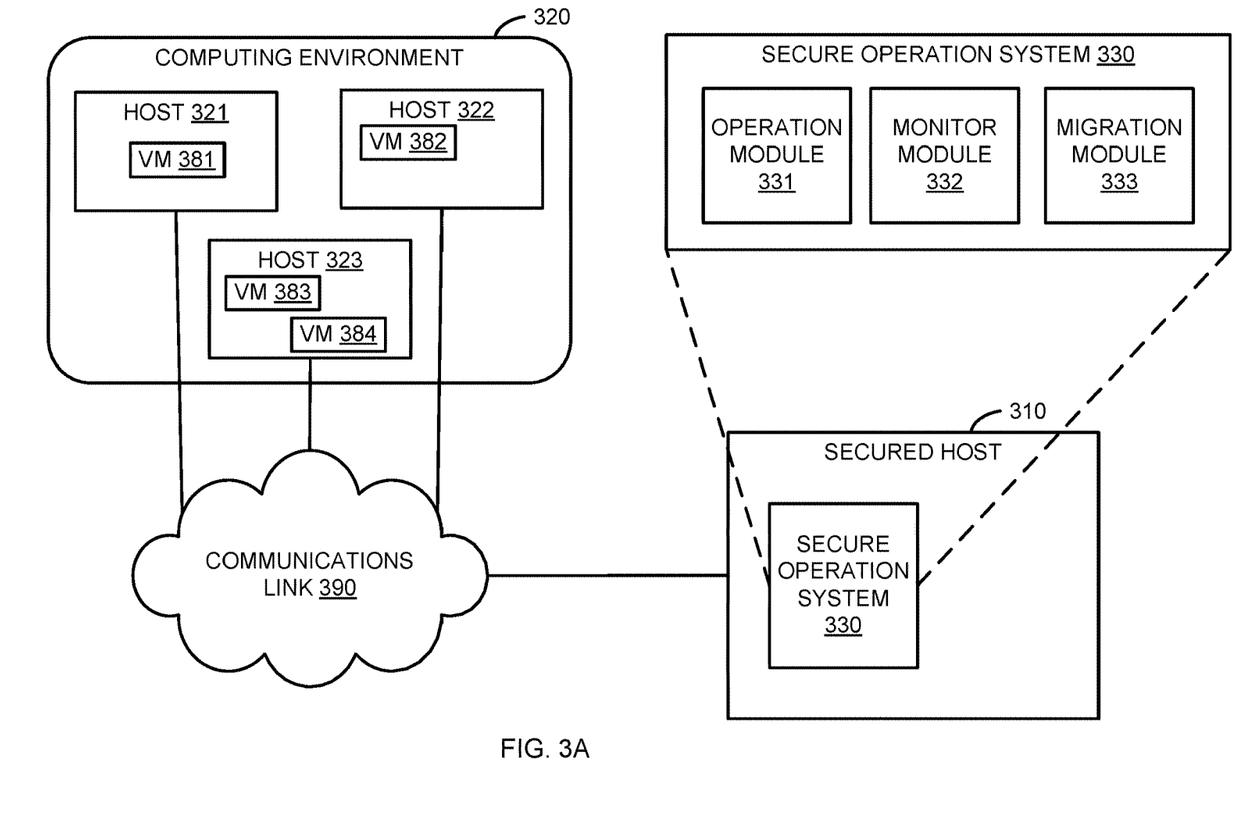
FIGS. 3A, 3B, and 3C illustrate a secure operation within an environment, according to an implementation.
Figure 3B:
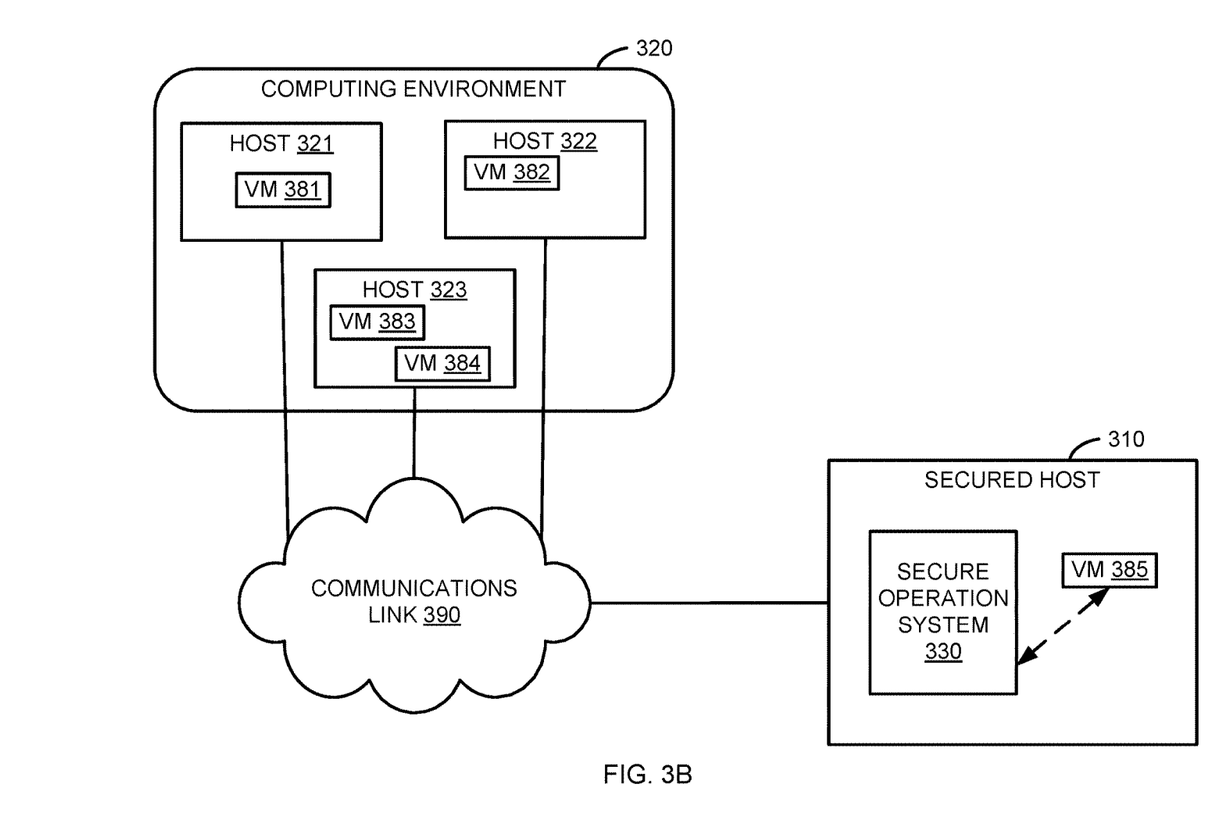
Figure 3C:
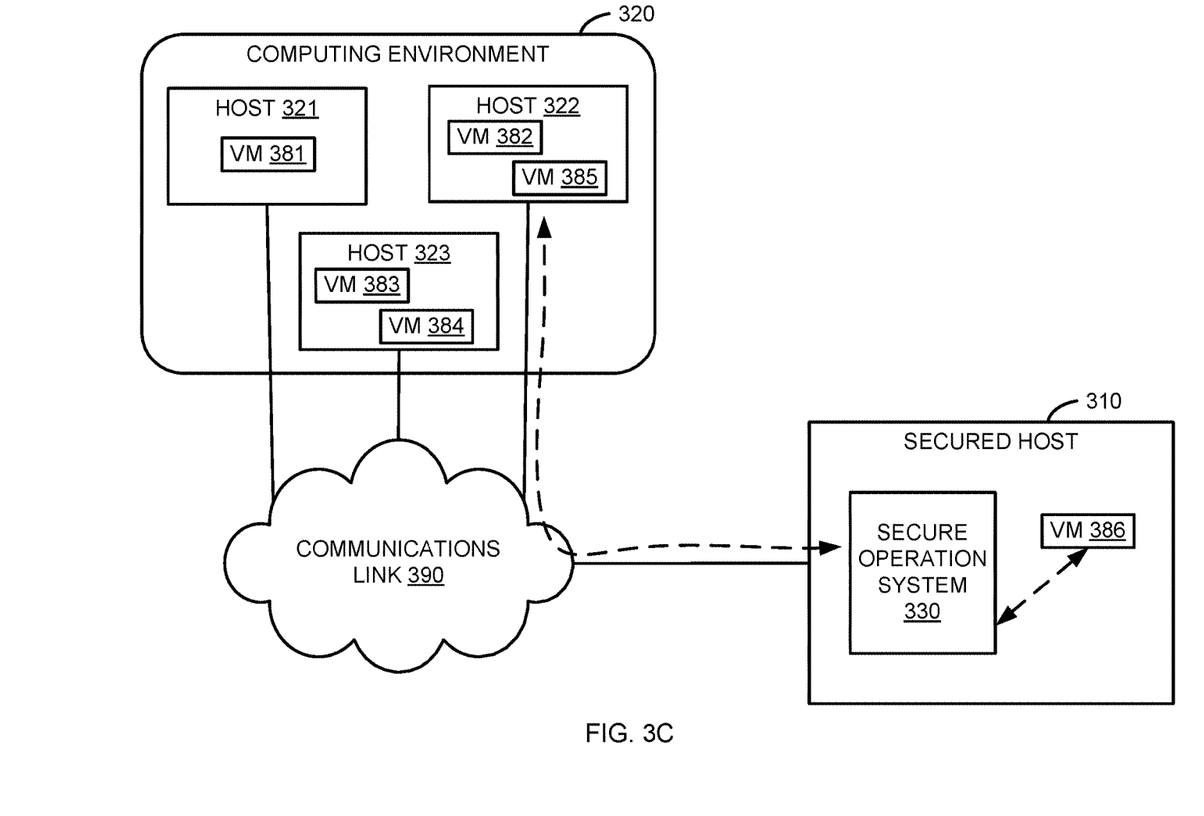

FIGS. 3A, 3B, and 3C illustrate a secure operation within an environment, according to an implementation. The environment illustrated in FIGS. 3A, 3B, and 3C includes secured host 310, computing environment 320, and communications link 390. Computing environment 320 includes a group of hosts 321, 322, and 323. In other implementations, computing environment 320 can include more or fewer hosts. Moreover, in some implementations, computing environment 320 can include management entities such as virtual machine and/or host management or monitoring software hosted at one or more hosts. As specific examples, computing environment 320 can be a cluster of computers, a distributed computing system, a rack of computing systems, or a data center.

Communications link 390 includes devices, services, or combinations thereof that define communications paths between secured host 310, hosts 321, 322, and 323, and/or other devices or services. For example, communications link 390 can include one or more of a cable (e.g., twisted-pair cable, coaxial cable, or fiber optic cable), a wireless link (e.g., radio-frequency link, optical link, or sonic link), or any other connectors or systems that transmit or support transmission of signals. Moreover, communications link 390 can include communications networks such as a switch fabric, an intranet, the Internet, other telecommunications networks, or a combination thereof. Additionally, communications link 390 can include proxies, routers, switches, gateways, bridges, load balancers, and similar communications devices.

Secured host 310 and hosts 321, 322, and 323 are computing systems at which virtual machines can be hosted. For example, each of secured host 310 and hosts 321, 322, and 323 can include a hypervisor to support hosting of one or more virtual machines at secured host 310 and hosts 321, 322, and 323.

As illustrated in FIGS. 3A, 3B, and 3C, secure operation system 330 is hosted at secured host 310. In other implementations, a secure operation system can be hosted at another host, and be in communication with a secured host via, for example, a communications link.

Secure operation system 330 includes one or more modules that manage or orchestrate secure operations associated with virtual machines. In other words, secure operation system 330 causes secure operations associated with virtual machines to be performed while those virtual machines are hosted at secured host 310 (or another secured host not shown). For example, secure operation system 330 can communicate with other hosts or management entities to migrate virtual machines to secured host 310 for secure operations, can cause virtual machines to be booted at secured host 310 in response to requests for virtual machines, and can migrate virtual machines from secured host 310 after secure operations associated with those virtual machine are complete. In some implementations, secure operation system 330 can be in communication with a group of secured hosts, and can manage or orchestrate secure operations associated with virtual machines at that group of secured hosts.

As illustrated in FIG. 3A, secure operation system 330 includes operation module 331, monitor module 332, and migration module 333. Although these particular modules (i.e., combinations of hardware and software) and various other modules are illustrated and discussed in relation to FIG. 3A and other example implementations, other combinations or sub-combinations of modules can be included within other implementations. Said differently, although the modules illustrated in FIG. 3A and discussed in other example implementations perform specific functionalities in the examples discussed herein, these and other functionalities can be accomplished, implemented, or realized at different modules or at combinations of modules. For example, two or more modules illustrated and/or discussed as separate can be combined into a module that performs the functionalities discussed in relation to the two modules. As another example, functionalities performed at one module as discussed in relation to these examples can be performed at a different module or different modules.

Operation module 331 initiates secure operations associated with virtual machines hosted at secured host 310. For example, operation module 331 can instantiate a virtual machine and provide bootstrap instructions to the virtual machine. As another example, operation module 331 can resume a virtual machine from a suspended state to initiate a secure operation at that virtual machine. As yet another example, operation module can provide a signal or instructions to a virtual machine to initiate a secure operation at the virtual machine.

In some implementations, operation module 331 determines whether a secure operation associated with a virtual machine can be initiated at the secure host. For example, in some implementations, operation module 331 determines whether any other virtual machines are hosted at secured host 310 before initiating a secure operation. If any other virtual machines are hosted at secured host, operation module 331 can wait to initiate the secure operation until those virtual machines have been migrated from secured host 310. In some implementations, secure operation system 330 can include a verification module (not shown) that verifies the integrity of secured host 310. For example, a verification module can communicate with a TPM at secured host 310 to determine whether an operating system image, configuration, security policy, or other components of secured host 310 has been altered from a trusted state. Operation module 331 can communicate with such a verification module to determine whether secured host 310 is trusted or secured before initiating a secure operation associated with a virtual machine.

Monitor module 332 determines that a secure operation associated with a virtual machine has completed at secured host 310. For example, monitor module 332 can intercept or access information provided by a virtual machine to a virtual terminal to determine the status of a secure operation. As another example, monitor module 332 can access information related to the status of a secure operation via a virtual network interface of a virtual machine. As another example, monitor module 332 can access such information at memory allocated to a virtual machine or a shared memory interface of a virtual machine. As yet another example, monitor module 332 can monitor the status of a secure operation associated with a virtual machine by monitoring or accessing signals at one or more virtual hardware interfaces of the virtual machine. In some implementations, a secure operation can have a known (or probabilistic) execution time or known (or probabilistic) maximum execution time, and monitor module 332 can determine that the secure operation is complete after that time has elapsed since initiation of the secure operation (e.g., since operation module 331 initiated the secure operation). Accordingly, in some implementations, operation module 331 and monitor module 332 can communicate (e.g., exchange signals) to coordinate monitoring and initiation of secure operations associated with virtual machines.

Migration module 333 migrates virtual machines from and/or to secure host 310. For example, after monitor module 332 determines that a virtual machine has booted (e.g., that a boot process initiated by operation module 331 has completed), migration module 333 can migrate the virtual machine to another host within computing environment 320. Accordingly, monitor module 332 and migration module 333 can communicate (e.g., exchange signals) to coordinate migration of virtual machines. As a specific example, monitor module 332 can provide a signal to migration module 333 to indicate that a secure operation associated with a virtual machine is complete.

In some implementations, migration module 333 receives a signal from a host such as host 322 indicating that a virtual machine such as VM 382 is about to perform a secure operation. Migration module 333 can cooperate with host 322 or a management system to migrate VM 382 to secured host. Operation module 331 can then initiate the secure operation (e.g., resume VM 382) at secured host 310.

As illustrated in FIG. 3A, virtual machines VM 381-VM 384 are hosted at or within computing environment 320. More specifically, virtual machine VM 381 is hosted at host 321, virtual machine VM 382 is hosted at host 322, and virtual machines VM 383 and VM 384 are hosted at host 323. As illustrated in FIG. 3B, secure operation system 330 instantiates virtual machine VM 385 at secured host 310, and initiates a boot process (here, a secure operation) at virtual machine VM 385 by providing bootstrap instructions to virtual machine VM 385. Secure operation system 330 monitors the boot process, and determines that the boot process is compete (e.g., as discussed above in relation to FIG. 2, determines that a cryptographic key has been provided to virtual machine VM 385 and virtual machine VM 385 is executing an operating system store at an encrypted boot volume) for virtual machine VM 385.

As illustrated in FIG. 3C, after secure operation system 330 determines that the boot process for virtual machine VM 385 is complete, secure operation system 330 migrates virtual machine VM 385 to host 322 within computing environment 320. Also as illustrated in FIG. 3C, secure operation system 330 instantiates another virtual machine VM 386, and initiates a boot process at virtual machine VM 386.

Figure 4A:
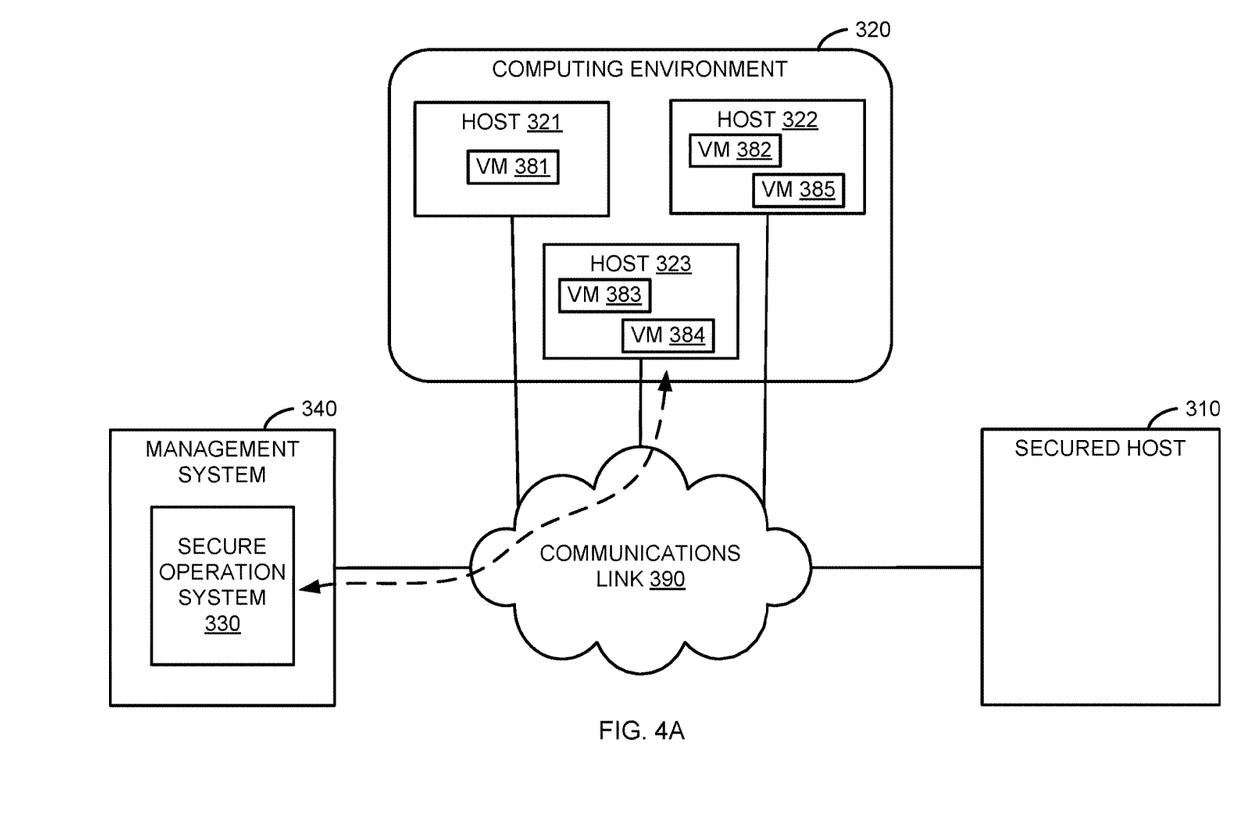
FIGS. 4A, 4B, and 4C illustrate another secure operation within an environment, according to another implementation.
Figure 4B:
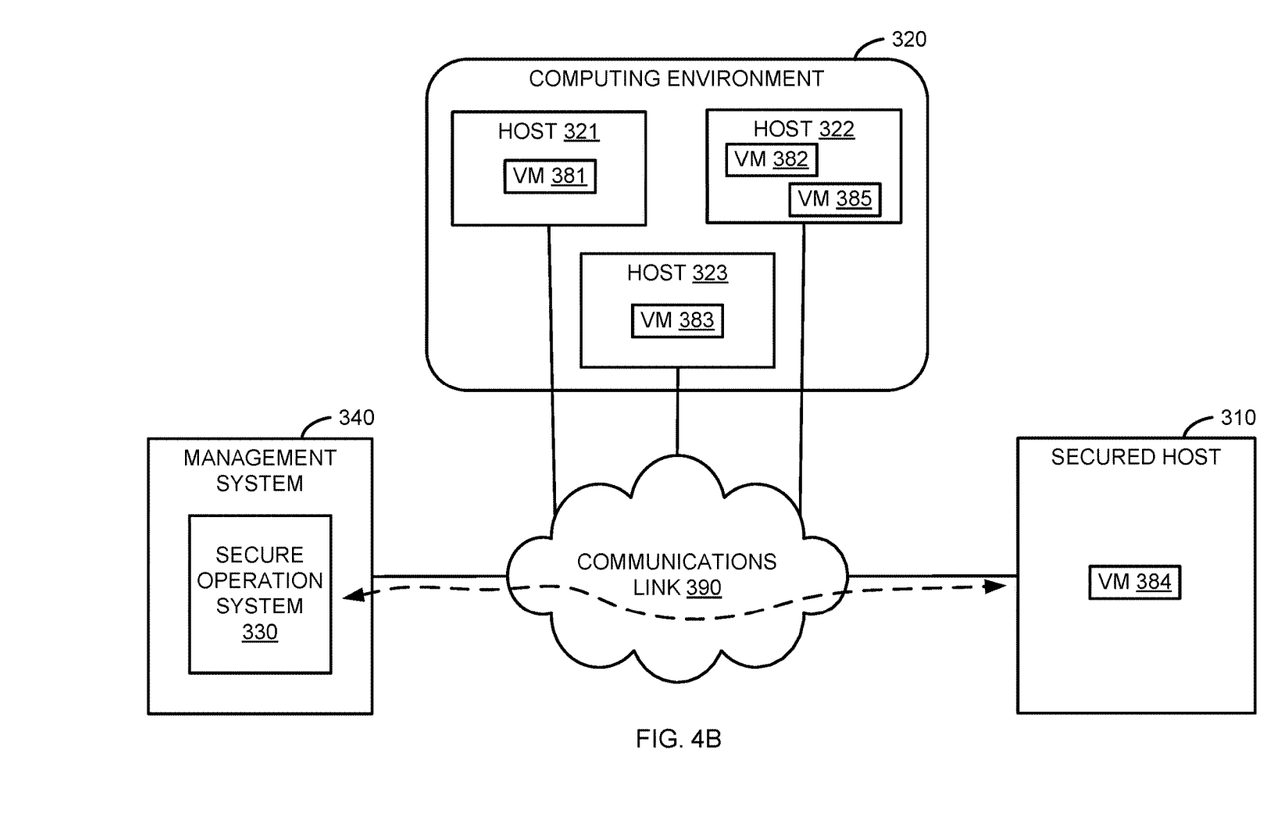
Figure 4C:
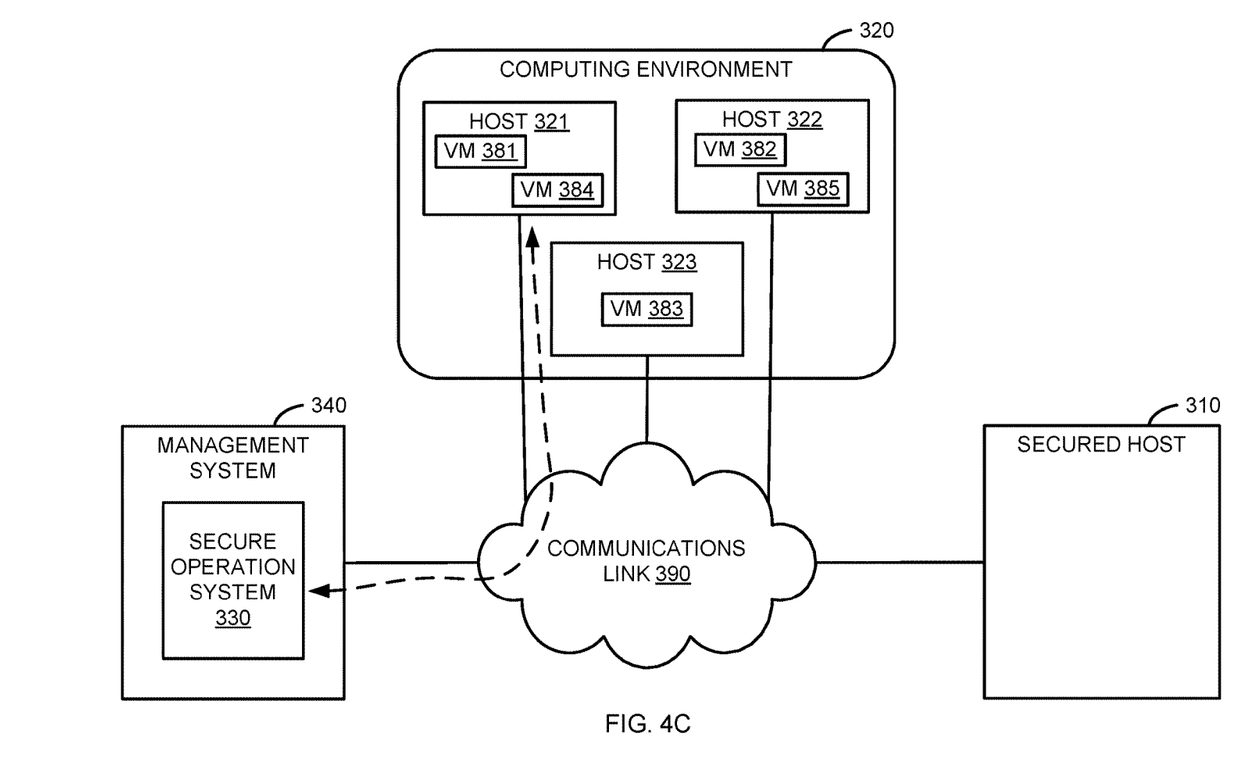

FIGS. 4A, 4B, and 4C illustrate another secure operation within an environment, according to another implementation. The environment illustrated in FIGS. 4A, 4B, and 4C is similar to the environment illustrated in FIGS. 3A, 3B, and 3C. In addition to secured host 310, computing environment 320, and communications link 390, the environment illustrated in FIGS. 4A, 4B, and 4C includes management system 340. Management system 340 is a computing system hosting secure operation system 330. Thus, secure operation system 330 is hosted at management system 340 rather than at secured host 310 as illustrated in FIGS. 3A, 3B, and 3C. In some implementations, management system 340 also hosts one or more applications to manage, orchestrate, or control the environment illustrated in FIGS. 4A, 4B, and 4C.

As illustrated in FIG. 4A, secure operation system 330 communicates with host 323 to determine that a secure operation associated with virtual machine VM 384 should be performed. For example, management system 340 can communicate with hosts of computing environment 320 (or virtual machines hosted at those hosts) to determine that a secure operation associated with a virtual machine hosted within computing environment 320 should be performed. As a specific example, a virtual machine can receive a request from a client of an application hosted at the virtual machine to perform a secure operation, and that virtual machine can provide a notification to the host at which it is hosted or to management system 340 (or secure operation system 330 hosted at management system 340) of the request for the secure operation.

As illustrated in FIG. 4B, secure operation system 330 can then migrate virtual machine VM 384 to secured host 310, and initiate the secure operation at secured host 310. As a specific example, after virtual machine VM 384 is migrated to secured host 310, secure operation system 330 can communicate with secured host 310 to resume execution of virtual machine VM 384 at secured host 310 to initiate the secure operation. Additionally, secure operation system 330 can monitor the secure operation to determine that the secure operation is complete.

In some implementations, secure operation system 330 communicates with secure host 310 to verify the integrity of secure host 310. Said differently, secure operation system 330 can request verification information from secure host 310 to determine whether secure host 310 can be considered secured or trusted. For example, secure operation system 330 can communicate with a module such as a TPM or an application in communication with at TPM at secured host 310 to access information such as cryptographic data to verify the integrity of secured host 310. As a specific example, secure operation system 330 can request cryptographically signed (e.g., using a digital signature or certificate of a TPM at secured host 310) verification information such as a version or hash of an operating system, application, or environment of secured host 310.

As another specific example, a secure operation can include accessing cryptographic data at a service (not shown) external to the environment illustrated in FIGS. 4A, 4B, and 4C. In response to a request from virtual machine VM 384 for cryptographic data such as a cryptographic key, the service can request a verification of the integrity of secured host 310. The request for the verification of the integrity of secured host 310 can be directed (or addressed) to virtual machine VM 384, secured host 310, or secure operation system 330. If the verification of the integrity of secured host 310 is directed to virtual machine VM 384 or secured host 310, virtual machine VM 384 or secured host 310 can redirect the request to secure operation system 330. Alternatively, virtual machine VM 384 or secured host 310 can request that secure operation system 330 provide the verification of the integrity of secured host 310 to the service on behalf of virtual machine VM 384 or secured host 310, respectively. In response to a request from virtual machine VM 384 or secured host 310, or if the verification of the integrity of secured host 310 is directed to secure operation system 330, secure operation system 330 can communicate with secured host 310 to verify the integrity of secured host 310 and provide the verification of the integrity of secured host 310 to the service. The service can then provide the requested cryptographic data to virtual machine VM 384 via secured host 310.

As illustrated in FIG. 4C, after secure operation system 330 determines that the secure operation is complete, secure operation system 330 can communicate with host 321 to migrate virtual machine VM 384 to host 321. For example, secure operation system 330 can communicate with a management application at management system 340 to determine a processor or memory load (or some other metric or combination of metrics) of hosts within computing environment 320, and select host 321 from the hosts within computing environment 320 based on the processor or memory load (or some other metric or combination of metrics). Secure operation system 330 can then communicate with host 321 to migrate virtual machine VM 384 to host 321 for continued execution of virtual machine VM 384.

Figure 5:
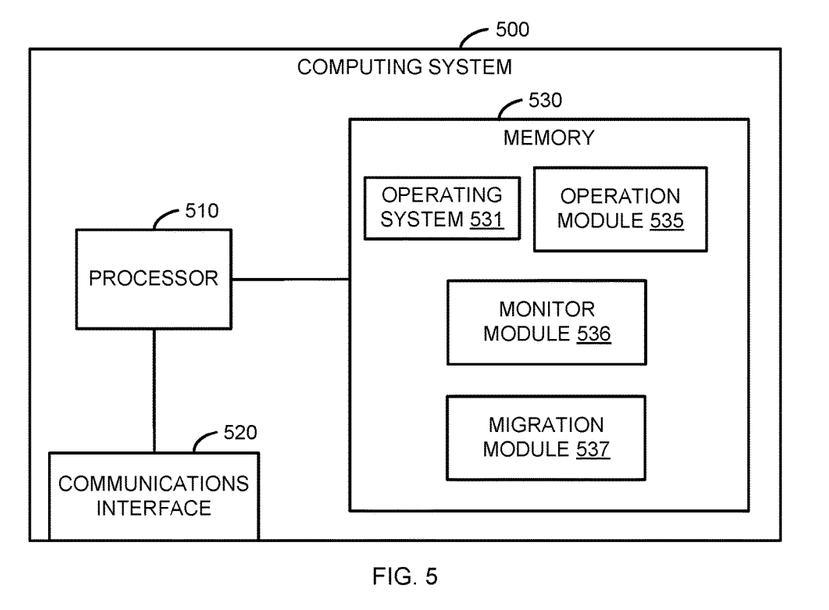
FIG. 5 is a schematic block diagram of a secure operation system hosted at a computing system, according to an implementation.

FIG. 5 is a schematic block diagram of a secure operation system hosted at a computing system, according to an implementation. In some implementations, a computing system hosting secure operation system is referred to as a secure operation system. In the example illustrated in FIG. 5, computing system 500 includes processor 510, communications interface 520, and memory 530. Processor 510 is any combination of hardware and software that executes or interprets instructions, codes, or signals. For example, processor 510 can be a microprocessor, an application-specific integrated circuit (ASIC), a distributed processor such as a cluster or network of processors or computing systems, a multi-core or multi-processor processor, or a virtual or logical processor of a virtual machine.

Communications interface 520 is a module via which processor 510 can communicate with other processors or computing systems via communications link. As a specific example, communications interface 520 can include a network interface card and a communications protocol stack hosted at processor 510 (e.g., instructions or code stored at memory 530 and executed or interpreted at processor 510 to implement a network protocol) to receive and send data. As specific examples, communications interface 520 can be a wired interface, a wireless interface, an Ethernet interface, a Fiber Channel interface, an InfiniBand interface, an IEEE 802.11 interface, or some other communications interface via which processor 510 can exchange signals or symbols representing data to communicate with other processors or computing systems.

Memory 530 is a processor-readable medium that stores instructions, codes, data, or other information. As used herein, a processor-readable medium is any medium that stores instructions, codes, data, or other information non-transitorily and is directly or indirectly accessible to a processor. Said differently, a processor-readable medium is a non-transitory medium at which a processor can access instructions, codes, data, or other information. For example, memory 530 can be a volatile random access memory (RAM), a persistent data store such as a hard disk drive or a solid-state drive, a compact disc (CD), a digital video disc (DVD), a Secure Digital™ (SD) card, a MultiMediaCard (MMC) card, a CompactFlash™ (CF) card, or a combination thereof or other memories. Said differently, memory 530 can represent multiple processor-readable media. In some implementations, memory 530 can be integrated with processor 510, separate from processor 510, or external to computing system 500.

Memory 530 includes instructions or codes that when executed at processor 510 implement operating system 531, operation module 535, monitor module 536, and migration module 537. Operation module 535, monitor module 536, and migration module 537 can collectively be referred to as a secure operation system. As discussed above, a secure operation system can include additional or fewer modules (or components) than illustrated in FIG. 5.

In some implementations, computing system 500 can be a virtualized computing system. For example, computing system 500 can be hosted as a virtual machine at a computing server. Moreover, in some implementations, computing system 500 can be a virtualized computing appliance, and operating system 531 is a minimal or just-enough operating system to support (e.g., provide services such as a communications protocol stack and access to components of computing system 500 such as communications interface 520) operation module 535, monitor module 536, and migration module 537.

The secure operation system including operation module 535, monitor module 536, and migration module 537 can be accessed or installed at computing system 500 from a variety of memories or processor-readable media. For example, computing system 500 can access a secure operation system at a remote processor-readable medium via communications interface 520. As a specific example, computing system 510 can be a network-boot device that accesses operating system 531, operation module 535, monitor module 536, and migration module 537 during a boot process (or sequence).

As another example, computing system 500 can include (not illustrated in FIG. 5) a processor-readable medium access device (e.g., CD, DVD, SD, MMC, or a CF drive or reader), and can access operation module 535, monitor module 536, and migration module 537 at a processor-readable medium via that processor-readable medium access device. As a more specific example, the processor-readable medium access device can be a DVD drive at which a DVD including an installation package for one or more of operation module 535, monitor module 536, and migration module 537 is accessible. The installation package can be executed or interpreted at processor 500 to install one or more of operation module 535, monitor module 536, and migration module 537 at computing system 500 (e.g., at memory 530). Computing system 500 can then host or execute one or more of operation module 535, monitor module 536, and migration module 537.

In some implementations, operation module 535, monitor module 536, and migration module 537 can be accessed at or installed from multiple sources, locations, or resources.

For example, some of operation module 535, monitor module 536, and migration module 537 can be installed via a communications link (e.g., from a file server accessible via a communication link), and others of operation module 535, monitor module 536, and migration module 537 can be installed from a DVD.

In other implementations, operation module 535, monitor module 536, and migration module 537 can be distributed across multiple computing systems. That is, some of operation module 535, monitor module 536, and migration module 537 can be hosted at one computing system and others of operation module 535, monitor module 536, and migration module 537 can be hosted at another computing system. As a specific example, operation module 535, monitor module 536, and migration module 537 can be hosted within a cluster of computing systems where each of operation module 535, monitor module 536, and migration module 537 is hosted at multiple computing systems, and no single computing system hosts each of operation module 535, monitor module 536, and migration module 537.

While certain implementations have been shown and described above, various changes in form and details may be made. For example, some features that have been described in relation to one implementation and/or process can be related to other implementations. In other words, processes, features, components, and/or properties described in relation to one implementation can be useful in other implementations. As another example, functionalities discussed above in relation to specific modules or elements can be included at different modules, engines, or elements in other implementations. Furthermore, it should be understood that the systems, apparatus, and methods described herein can include various combinations and/or sub-combinations of the components and/or features of the different implementations described. Thus, features described with reference to one or more implementations can be combined with other implementations described herein.

As used herein, the term "module" refers to a combination of hardware (e.g., a processor such as an integrated circuit or other circuitry) and software (e.g., machine- or processor-executable instructions, commands, or code such as firmware, programming, or object code). A combination of hardware and software includes hardware only (i.e., a hardware element with no software elements), software hosted at hardware (e.g., software that is stored at a memory and executed or interpreted at a processor), or hardware and software hosted at hardware.

Additionally, as used herein, the singular forms "a," "an," and "the" include plural referents unless the context clearly dictates otherwise. Thus, for example, the term "module" is intended to mean one or more modules or a combination of modules. Moreover, the term "provide" as used herein includes push mechanism (e.g., sending data to a computing system or agent via a communications path or channel), pull mechanisms (e.g., delivering data to a computing system or agent in response to a request from the computing system or agent), and store mechanisms (e.g., storing data at a data store or service at which a computing system or agent can access the data). Furthermore, as used herein, the term "based on" means "based at least in part on." Thus, a feature that is described as based on some cause, can be based only on the cause, or based on that cause and on one or more other causes.

What is claimed is:

1. A non-transitory processor-readable medium storing instructions that when executed cause a system to:
receive an indication that a virtual machine is to begin a boot process;
in response to the received indication and prior to beginning the boot process, migrate the virtual machine from a first host to a secured host, wherein the secured host includes a security mechanism to provide security that is unavailable at the first host;
in response to the migrating, initiate the boot process of the virtual machine at the secured host;
determine that the boot process of the virtual machine at the secured host is complete; and
migrate the virtual machine from the secured host to a host other than the secured host in response to the determining that the boot process of the virtual machine at the secured host is complete.

2. The non-transitory processor-readable medium of claim 1, wherein the boot process of the virtual machine accesses cryptographic data.

3. The non-transitory processor-readable medium of claim 2, wherein the cryptographic data includes a cryptographic key, and the boot process of the virtual machine accesses the cryptographic key to decrypt an encrypted volume.

4. The non-transitory processor-readable medium of claim 1, further comprising instructions that when executed cause the system to:
provide trusted bootstrap instructions to the virtual machine at the secured host to perform the boot process of the virtual machine.

5. The non-transitory processor-readable medium of claim 4, further comprising instructions that when executed cause the system to:
prior to providing the trusted bootstrap instructions to the virtual machine at the secured host, verify, at the secured host, the trusted bootstrap instructions using a cryptographic hash or a digital signature.

6. The non-transitory processor-readable medium of claim 4, further comprising instructions that when executed cause the system to:
access, by a secure operating system at the secured host, the trusted bootstrap instructions from a secured boot volume that is accessible exclusively by the secure operating system.

7. The non-transitory processor-readable medium of claim 1, wherein the boot process is not initiated at the first host in response to the received indication.

8. The non-transitory processor-readable medium of claim 1, further comprising instructions that when executed cause the system to determine that the virtual machine is the only virtual machine at the secured host, wherein the initiating of the boot process is in response to determining that the virtual machine is the only virtual machine at the secured host.

9. The non-transitory processor-readable medium of claim 1, wherein the indication is received in response to a hypervisor detecting that the virtual machine is accessing a specified emulated hardware.

10. The non-transitory processor-readable medium of claim 1, wherein the first host is without the security mechanism while the virtual machine executes on the first host.

11. A system comprising:
a processor; and
a non-transitory storage medium storing instructions executable on the processor to:
receive an indication that a virtual machine is to begin a boot process;

in response to the received indication, migrate the virtual machine from a first host to a secured host, wherein the secured host includes a security mechanism to provide security that is unavailable at the first host, and wherein the boot process is not initiated at the first host in response to the received indication;

in response to the migrating, initiate the boot process of the virtual machine at the secured host;

determine that the boot process of the virtual machine at the secured host is complete; and migrate the virtual machine from the secured host to a host other than the secured host in response to the determining that the boot process of the virtual machine at the secured host is complete.

12. The system of claim 11, wherein the boot process is to access a cryptographic key to decrypt an encrypted volume.

13. The system of claim 11, wherein the instructions are executable on the processor to:

provide trusted bootstrap instructions to the virtual machine at the secured host to perform the boot process of the virtual machine.

14. The system of claim 13, wherein the instructions are executable on the processor to:

prior to providing the trusted bootstrap instructions to the virtual machine at the secured host, verify, at the secured host, the trusted bootstrap instructions using a cryptographic hash or a digital signature.

15. The system of claim 13, wherein the instructions are executable on the processor to:

access, by a secure operating system at the secured host, the trusted bootstrap instructions from a secured boot volume that is accessible exclusively by the secure operating system.

16. The system of claim 11, wherein the instructions are executable on the processor to:

provide a signal to indicate completion of the boot process of the virtual machine at the secured host, wherein the migrating of the virtual machine to the host other than the secured host is in response to the signal.

17. A method of a system comprising a processor, comprising:

receiving an indication that a virtual machine is to begin a boot process;

in response to the received indication and prior to beginning the boot process, migrating the virtual machine from a first host to a secured host, wherein the secured host includes a security mechanism to provide security that is unavailable at the first host;

in response to the migrating, initiating the boot process of the virtual machine at the secured host;

determining that the boot process of the virtual machine at the secured host is complete; and migrating the virtual machine from the secured host to a host other than the secured host in response to the determining that the boot process of the virtual machine at the secured host is complete.

18. The method of claim 17, further comprising executing bootstrap instructions at the secured host to perform the boot process, the bootstrap instructions comprising instructions to cause the virtual machine to access cryptographic data external to the virtual machine.

19. The method of claim 18, further comprising:

identifying an encrypted volume to the virtual machine, the cryptographic data including a cryptographic key associated with the encrypted volume.

20. The method of claim 17, wherein the boot process is not initiated at the first host in response to the received indication.

* * * * *